US012772984B1

(12) United States Patent
Trayler et al.

(10) Patent No.: US 12,772,984 B1
(45) Date of Patent: Oct. 27, 2026

(54) POULTRY PROCESSING SYSTEM FOR INLINE PROCESSING A POULTRY CARCASS FRONT HALF

(71) Applicant: Foodmate B.V., Numansdorp (NL)

(72) Inventors: Marvin Edward Trayler, Perry, GA (US); Timothy Scott Burrell, Ellijay, GA (US)

(73) Assignee: Foodmate B.V., Numansdorp (NL)

( * ) Notice: Subject to any disclaimer, the term of this patent is extended or adjusted under 35 U.S.C. 154(b) by 0 days.

(21) Appl. No.: 19/389,861

(22) Filed: Nov. 14, 2025

(51) Int. Cl.
*A22C 21/00* (2006.01)

(52) U.S. Cl.
CPC ........ *A22C 21/003* (2013.01); *A22C 21/0046* (2013.01); *A22C 21/0053* (2013.01); *A22C 21/0069* (2013.01)

(58) Field of Classification Search
CPC ............ A22C 21/0003; A22C 21/0046; A22C 21/0069
USPC .......................................................... 452/198
See application file for complete search history.

(56) References Cited

U.S. PATENT DOCUMENTS 5,697,837 A * 12/1997 Verrijp ................. A22C 21/003 452/136
5,951,393 A * 9/1999 Barendregt .......... A22C 21/003 452/185

FOREIGN PATENT DOCUMENTS

KR 102121204 B1 6/2020
WO 2013007559 A1 1/2013

OTHER PUBLICATIONS

International Search Report and Written Opinion for Application No. PCT/NL2025/050582 dated Apr. 2, 2026 (22 pages).

* cited by examiner

*Primary Examiner* — Richard T Price, Jr.
(74) *Attorney, Agent, or Firm* — Michael Best & Friedrich LLP

(57) ABSTRACT

A poultry processing system for inline processing a poultry carcass front half, the system including a mandrel, a conveyor and a poultry processing station. The mandrel has a plane of symmetry in a vertical orientation for supporting a carcass front half having a neck end and a tail end. The conveyor conveys the mandrel in a horizontal conveyance direction. The mandrel is coupled to the conveyor in a fixed orientation relative to the conveyance direction in which the plane of symmetry aligns with the conveyance direction. The poultry processing station is in a conveyance path of the conveyor, and includes a processing member for engaging the carcass front half as it is conveyed on the mandrel in the fixed orientation along the poultry processing station. The processing member is movable relative to the conveyor along a trajectory within a vertical plane parallel to the plane of symmetry between a first position and a second position.

18 Claims, 9 Drawing Sheets

POULTRY PROCESSING SYSTEM FOR INLINE PROCESSING A POULTRY CARCASS FRONT HALF

FIELD OF THE INVENTION

The present invention relates to the field of poultry processing. In particular, the invention relates to the field of processing of a front half of a poultry carcass for harvesting meat therefrom.

BACKGROUND

The processing of poultry carcasses, for harvesting poultry meat therefrom, may involves a separation of the poultry carcass into a back half that generally includes the legs and sometimes part of the lower back portion, and a front half that generally includes the breast and an upper back portion. The carcass front half particularly includes breast meat and tenders, which can be extracted from the carcass front half in an automated manner. Known poultry processing systems convey carcass front halves in succession along a series of processing stations, wherein each front half is suspended by a mandrel. Each processing station performs a processing step on the front half, such as cutting, and extracting skin or meat.

Known poultry processing systems employ mandrels with increased mobility, so as to change the orientation of the poultry carcass for enhanced cooperation with the different processing stations. Known mandrels are for example configured to pivot about multiple pivot axis, and requiring complex actuation mechanisms therefor. Poultry processing systems with such mandrels may therefore be relatively costly to assemble, operate, clean, and maintain.

SUMMARY

It is an object to overcome or ameliorate at least one of the disadvantages of the prior art. It is also an object to provide alternative structures which are less cumbersome in assembly and operation and which moreover can be made relatively inexpensively. Alternatively it is an object to at least provide a useful alternative.

An aspect provides a poultry processing system for inline processing a poultry carcass front half. The system comprises a mandrel having a plane of symmetry for supporting a front half having a neck end and a tail end with its skeletal structure including a keel bone on top of the mandrel with the keel bone aligned with the plane of symmetry of the mandrel. The system comprises a conveyor for conveying the mandrel in a horizontal conveyance direction. The conveyor is particularly configured for conveying the mandrel along a conveyance trajectory. The conveyor can comprise and endless conveyor and/or an overhead conveyor. The mandrel is coupled to the conveyor in a fixed orientation relative to the conveyance direction in which the plane of symmetry is vertical and aligns with the conveyance direction. The mandrel is hence coupled to the conveyor in a fixed orientation relative to the conveyance direction along the entire conveyance trajectory of the conveyor. The mandrel can be rotationally and/or translationally fixed with respect to the conveyance direction. The fixed orientation of the mandrel relative to the conveyor may particularly be such that the mandrel supports the breast cap during conveyance with the neck end leading and with a tail end trailing. The system comprises a poultry processing station in a conveyance path of the conveyor.

The poultry processing station comprises a processing member. The processing member is configured for engaging the carcass front half as the carcass front half is conveyed on the mandrel in the fixed orientation along the poultry processing station. The processing member is movable relative to the conveyor along a trajectory within a vertical plane parallel to the plane of symmetry between a first position for allowing the carcass front half to pass the processing member, and a second position for engaging the carcass front half. The processing member can for example comprise a knife for cutting a certain part of the poultry carcass front half. The trajectory can be at least partially linear and/or circular within the vertical plane.

With the mandrel being in the fixed orientation with respect to the conveyance direction, the processing member can vertically approach the poultry carcass front half to perform a processing operation thereon, such as cutting, deskinning, extracting, etc., as the poultry carcass front half is conveyed, and be withdrawn from the poultry carcass front half thereafter. The processing station may particularly manipulate a breast-side of the poultry carcass front half.

In an example, the mandrel is only be translatable relative to the conveyor in a direction transverse to the conveyance direction, for example horizontally or vertically, or a combination thereof.

Optionally, the mandrel in the fixed orientation extends in the horizontal conveyance direction from a trailing proximal end where the mandrel connects to the conveyor to a leading free distal end.

Optionally, the conveyor includes horizontally transverse guide rods configured for guiding movement of the mandrel in a horizontal direction transverse to the conveyance direction, while maintaining the mandrel in the fixed orientation. The mandrel may hence be translated laterally with respect to the conveyance direction.

Optionally, the trajectory of the processing member is adjustable based on a dimension of the poultry carcass front half. The trajectory of the processing member may hence be adapted to a size of the poultry carcass front half. The poultry processing system may for example comprise a sensor for measuring the dimension of the poultry carcass front half, for example a vertical position or extent of the poultry carcass front half. Based on a sensor signal generated by the sensor, the trajectory may be adjusted between successive poultry carcasses. The second position may hence vary between cycles of the processing member, in dependence on the poultry carcass to be processed during that cycle.

Optionally, the poultry processing station is a wishbone pre-cutting station. The processing member may include a pivot arm that is pivotable about a horizontal pivot axis extending transverse to the conveyance direction, and a stabbing knife that is mounted to the pivot arm. The pivot arm can be an elongate member. The stabbing knife can comprise a blade and/or cutting means. The pivot arm is configured for being pivotally moved from the first position, in which the pivot arm for example is in a substantially horizontal orientation, to the second position, in which the pivot arm for example is in a substantially vertical orientation. The second position is with respect to the conveyance direction in front of the mandrel for stabbing a leading part of the poultry carcass front half with the stabbing knife. The stabbing knife can be configured to cut the tissue between the wishbone and the remaining part of the carcass front half. The stabbing knife can comprise a sharp tip, and one or more sharp edges.

Optionally, the pivot arm is configured for being pivotally moved from the second position back to the first position in reverse direction for withdrawing the stabbing knife from the leading part of the poultry carcass. The pivot arm may hence pivoted back and forth between the first position and the second position by reversing direction. The pivot arm may for instance be pivoted from the first position clockwise about the pivot axis to the second position, and be pivoted from the second position counter clockwise about the pivot axis to the first position, or vice versa.

Optionally, the stabbing knife is movably mounted to the pivot arm, and the poultry processing station is configured for imparting a stabbing motion to the stabbing knife relative to the pivot arm. It will be appreciated that the stabbing motion involves a motion of the stabbing knife towards the poultry carcass front half, e.g. generally along a longitudinal direction of the knife, with the aim to insert the stabbing knife into poultry carcass front half. The stabbing knife can be mounted to the pivot arm by means of a telescopic mechanism and/or a slide-out mechanism.

Optionally, the stabbing motion is in a direction substantially opposite to the conveyance direction. The stabbing may hence be performed with a relative speed that is higher than the conveyance speed. The stabbing motion can be configured to be in a direction such that it engages a leading part of the wishbone, such that the stabbing knife is configured to cut the tissue connecting the leading part of the wishbone to the remaining part of the carcass front half.

Optionally, the stabbing motion is at an oblique downward angle with respect to the conveyance direction. The stabbing motion can be configured to be in a direction substantially parallel to a part of the wishbone, in order to cut the tissue between the wishbone and the remaining part of the carcass front half with the stabbing motion using the stabbing knife.

Optionally, the poultry processing station is a breast meat cutting station. The processing member may include a breast meat cutter having a cutting plane transverse to the plane of symmetry. The breast meat cutter can comprise a knife, such as a rotatable knife. The breast meat cutter is configured for being moved along a cyclic trajectory in a plane parallel to the plane of symmetry. The cyclic trajectory can be in a vertical plane that is parallel to the plane of symmetry. The cyclic trajectory can have an at least partially cylindrical, ellipse and/or oval shape.

Optionally, the cyclic trajectory includes a trajectory section, associated with the second position, in which the breast meat cutter is moved in synchrony with the mandrel for providing a cut in the poultry carcass front half in the cutting plane. At the trajectory section, the breast meat cutter may hence be moved in generally the same direction and at generally the same speed as the poultry carcass front half. The trajectory section can hence relatively linear parallel to the conveyance direction.

Optionally, the poultry processing station is a carcass front half unloading station configured for unloading the carcass front half from the mandrel at a leading end of the mandrel. The carcass front half unloading station can hence be configured to unload the carcass front half from the mandrel in a direction counter to the conveyance direction of the conveyor.

Optionally, the processing member comprises a pusher organ arranged above the conveyance path. The processing member is configured for, while the poultry carcass front half is being conveyed on the mandrel, being moved relative to the mandrel in a substantially vertical direction for pushing a leading part of the carcass front half downwards. The pusher organ may be configured to push the poultry carcass front half so as to initiate a release of the poultry carcass front half from the mandrel. The pusher organ may for example push the leading part of the carcass front half such that the carcass front half shifts, particularly tilting its leading part downward, with respect to the mandrel. The pusher organ can be configured to move between the first position and the second position as described in view of the processing member.

Optionally, the pusher organ is pivotably movable about a horizontal pivot axis that extends transverse to the conveyance direction. It will be appreciated that the pusher organ can alternatively or additionally be translationally movable a vertical direction.

Optionally, the pusher organ is biased towards the second position. The pusher organ can hence be pre-tensioned towards the second position such that it is configured to automatically return to the second position after it has been released from the first position. The biasing force towards the second position may drive the pushing motion of the pusher organ.

Optionally, the carcass front half unloading station comprises a stationary guide. The stationary guide is arranged with respect to the conveyance path downstream of the pusher organ for engaging the poultry carcass front half and guiding the poultry carcass front half further downward to urge the carcass front half off the mandrel. The stationary guide can be arranged to engage the poultry carcass front half and guide it downwardly away from the mandrel. Under influence of the stationary guide, the carcass front half may hence tilt with respect to the mandrel, to be released therefrom at the leading side of the mandrel. The tilting of the poultry carcass front half may initiated by the pusher organ, and be taken over by the stationary guide for completing the release of the poultry carcass front half from the mandrel. The stationary guide a bottom surface and/or a top surface of the poultry carcass front half. Alternatively, the stationary guide can be arranged to engage the poultry carcass front half at a substantially middle portion in vertical direction of the carcass front half.

Optionally, the stationary guide includes two mutually symmetric guides being laterally spaced apart from each other. The two mutually symmetric guides comprise an upstream ramp section arranged at a downwardly directed incline with respect to the conveyance direction, an intermediate horizontal section parallel to the conveyance direction, and a downstream ramp section at a downwardly directed incline with respect to the conveyance direction. The upstream downwardly directed ramp may be arranged to engage a leading end of the poultry carcass front half as the carcass front half is conveyed, and guide the leading end downwardly. The intermediate horizontal section is configured for enabling the poultry carcass to shift with respect to the mandrel in an upstream direction, as the downwardly directed guiding force of the upstream ramp diminishes. The downstream downwardly directed ramp subsequently engages the leading end of the poultry carcass front half, and guides the leading end further downwardly to tilt it over the leading end of the mandrel to complete the release from the mandrel. The poultry carcass front half may be collected below the stationary guide, e.g. for further processing.

Another aspect provides a method for inline processing of a poultry carcass front half. The method comprises supporting the carcass front half on a mandrel. The mandrel has a plane of symmetry in a vertical orientation for supporting the carcass front half having a neck end and a tail end with its skeletal structure including a keel bone on top of the mandrel with the keel bone aligned with the plane of symmetry of the mandrel. The method comprises conveying the mandrel in a horizontal conveyance direction with a conveyor, particularly with the neck end leading and the tail end trailing. The mandrel is coupled to the conveyor in a fixed orientation relative to the conveyance direction in which the plane of symmetry aligns with the conveyance direction. The method comprises during conveying, selectively engaging the carcass front half with a processing member of a poultry processing station in a conveyance path of the conveyor as the carcass front half is conveyed on the mandrel in the fixed orientation along the poultry processing station. The processing member is movable relative to the conveyor along a trajectory within a vertical plane parallel to the plane of symmetry between a first position for allowing the carcass front half to pass the processing member, and a second position for engaging the carcass front half.

Optionally, the poultry processing station is a wishbone pre-cutting station. The processing member includes a pivot arm that is pivotable about a horizontal pivot axis extending transverse to the conveyance direction. The processing member includes a stabbing knife that is mounted to the pivot arm. The method further comprises pivotally moving the pivot arm from the first position, in which the pivot arm for example is in a substantially horizontal orientation, to the second position, in which the pivot arm for example is in a substantially vertical orientation. The second position is with respect to the conveyance direction in front of the mandrel for stabbing a leading part of the poultry carcass front half with the stabbing knife.

Optionally, the method is carried out according to the characteristics described in view of the poultry processing system, wherein the poultry processing station is a wishbone pre-cutting station as described herein.

Optionally, the poultry processing station is a breast meat cutting station. The processing member includes a breast meat cutter having a cutting plane transverse to the plane of symmetry. The method further comprises moving the breast meat cutter along a cyclic trajectory in a plane parallel to the plane of symmetry.

Optionally, the method is carried out according to the characteristics described in view of the poultry processing system, wherein the poultry processing station is a breast meat cutting station as described herein.

Optionally, the poultry processing station is a carcass front half unloading station. The method further comprises unloading, using the carcass front half unloading station, the carcass front half from the mandrel at a leading end of the mandrel.

Optionally, the method is carried out according to the characteristics described in view of the poultry processing system, wherein the poultry processing station is a carcass front half unloading station as described herein.

Another aspect provides a multi-station poultry processing system for inline processing a poultry carcass front half. The multi-station poultry processing system comprises a mandrel and a conveyor such as described in view of the poultry processing system. The system comprises at least two poultry processing stations as described in view of the poultry processing system. Each of the at least two poultry processing stations comprises a different one of a wishbone pre-cutting station, a breast meat cutting station and a carcass front half unloading station as described in view of the poultry processing system. The at least two poultry processing stations are consecutively positioned in the conveyance path of the conveyor.

Another aspect provides a method for multi-station inline processing of a poultry carcass front half. The method comprises supporting the carcass front half on a mandrel. The method comprises conveying the mandrel in a horizontal conveyance direction with a conveyor. The method comprises during conveying, selectively engaging the carcass front half with a processing member of a poultry processing station as described in view of the method for inline processing of a poultry carcass front half. The method comprises performing at least two method steps, each step being performed with one of at least two poultry processing stations as described herein. Each of the at least two method steps comprises a different one of pivotally moving the pivot arm from the first position to the second position, moving the breast meat cutter along a cyclic trajectory in a plane parallel to the plane of symmetry, and unloading the carcass front half from the mandrel at a leading end of the mandrel, as described herein. The at least two method steps are consecutively performed on the carcass front half while the mandrel is being conveyed in the conveyance direction.

It will be appreciated that any of the aspects, features and options described in view of the poultry processing system for inline processing a poultry carcass front half apply equally to the method for inline processing of a poultry carcass front half, the multi-station poultry processing system for inline processing of a poultry carcass front half, the method for multi-station inline processing of a poultry carcass front half, and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Figure 1A:
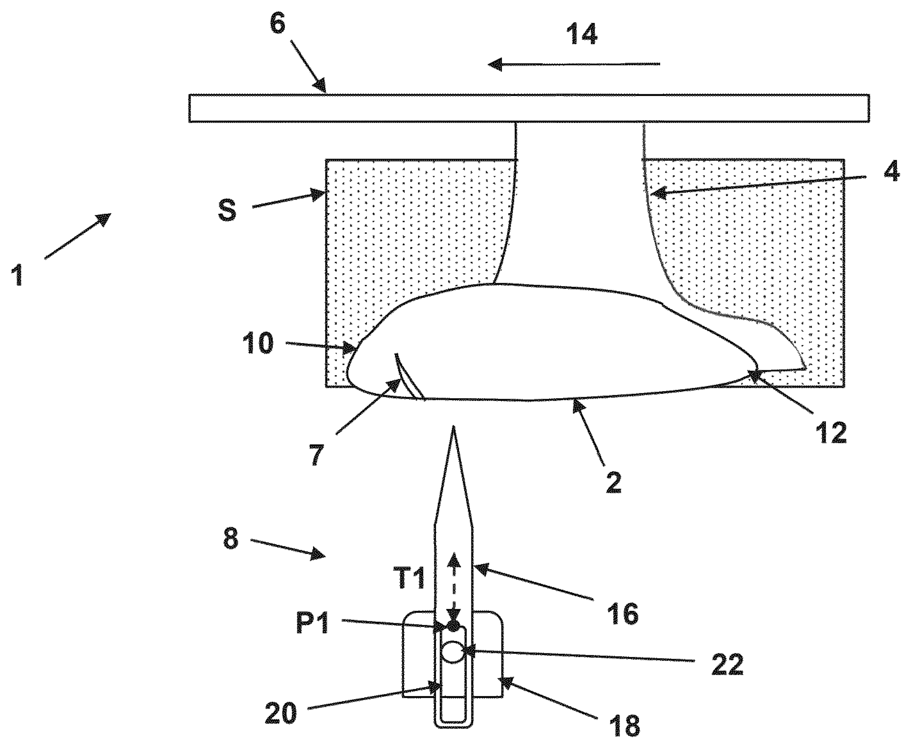
FIGS. 1A and 1B show illustrations of a schematic representation of an example of a side view of a poultry processing system.
Figure 1B:
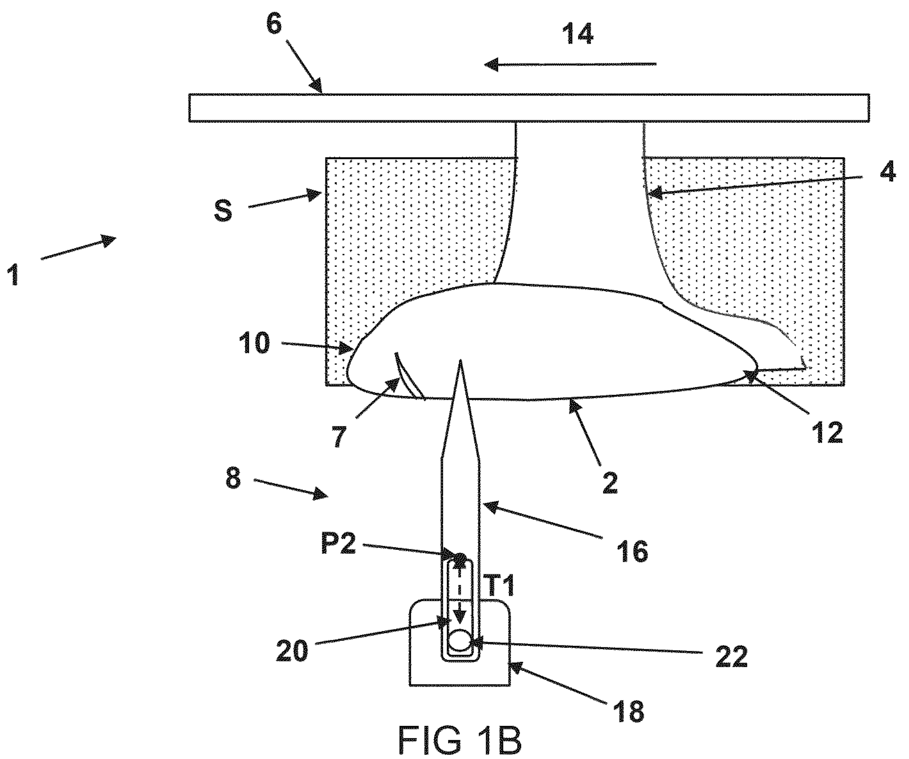

FIGS. 1A and 1B show illustrations of a schematic representation of an example of a side view of a poultry processing system 1 for inline processing a poultry carcass front half 2. The system 1 comprises a mandrel 4, a conveyor 6 and a poultry processing station 8. The mandrel 4 has a plane of symmetry S in a vertical orientation configured for supporting a carcass front half 2 having a neck end 10 and a tail end 12 with its skeletal structure including a keel bone on top of the mandrel 4 with the keel bone aligned with the plane of symmetry S of the mandrel 4. The poultry carcass front half 2 in this example comprises a wishbone 7. The conveyor 6 is configured for conveying the mandrel 4 in a horizontal conveyance direction 14. The mandrel 4 is coupled to the conveyor 6 in a fixed orientation relative to the conveyance direction 14. The mandrel 4 can be rotationally and/or translationally fixed with respect to the conveyance direction 14. The plane of symmetry S aligns with the conveyance direction 14. The orientation of the mandrel 4 relative to the conveyor 6 is particularly such that the breast cap 2 is conveyed on the mandrel 4 by the conveyor 6 with a neck end 10 of the breast cap 2 leading and with a tail end 12 of the breast cap 2 trailing.

The poultry processing station 8 is positioned in a conveyance path of the conveyor 6. The poultry processing station 8 comprises a processing member 16 for engaging the carcass front half 2 as the carcass front half 2 is conveyed on the mandrel 4 in the fixed orientation along the poultry processing station 8. In this example, the poultry processing station 8 is mounted horizontally below the conveyor 6 using mounting means 18. The processing member 16 is movable relative to the conveyor 6 along a trajectory T1 within a vertical plane parallel to the plane of symmetry S between a first position P1 for allowing the carcass front half 2 to pass the processing member 8, and a second position P2 for engaging the carcass front half 2. In FIG. 1A, the processing member 16 is in the first position P1. FIG. 1B shows the processing member 16 in the second position P2. The processing member 16 in this example comprises an elongate blade configured for cutting the poultry carcass front half. It will be appreciated that the processing member 16 can comprise other types of cutting means and/or means for processing at least a part of the carcass front half 2. Here, the processing member 16 is configured to slidably move between the first and second position P1, P2. Thereto, the processing member 16 comprises a cam track 20 and the mounting means 18 comprise a cam roller 22.

Figure 2A:
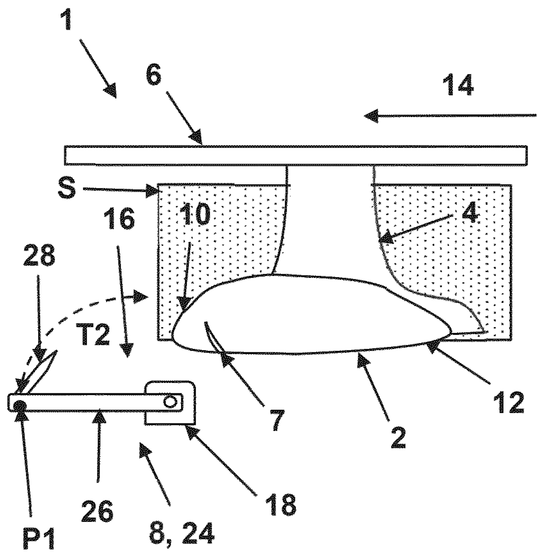
FIGS. 2A, 2B, 2C and 2D show illustrations of a schematic representation of an example of a side view of a poultry processing system.
Figure 2B:
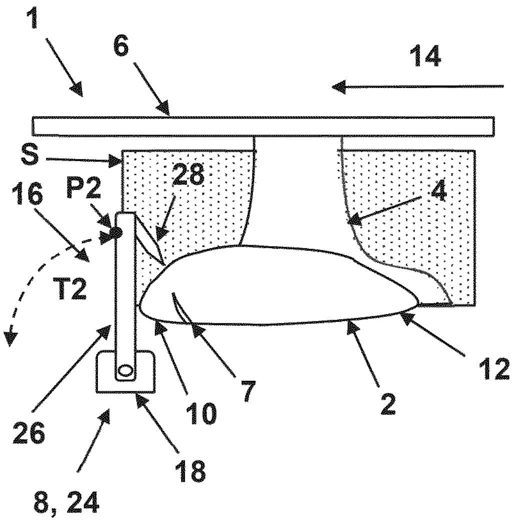

FIGS. 2A, 2B, 2C and 2D show illustrations of a schematic representation of an example of a side view of a poultry processing system 1 for inline processing a poultry carcass front half 2. The poultry processing station 8 of the system 1 is in this example a wishbone pre-cutting station 24. The processing member 16 includes a pivot arm 26 and a stabbing knife 28. The pivot arm 26 is pivotable about a horizontal pivot axis extending transverse to the conveyance direction 14. The stabbing knife 28 is mounted to the pivot arm 26. The pivot arm 26 is configured for being pivotally moved from the first position P1, in which the pivot arm 26 for example is in a substantially horizontal orientation, to the second position P2, in which the pivot arm for example is in a substantially vertical orientation. The second position P2 is with respect to the conveyance direction in front of the mandrel 4 for stabbing a leading part of the poultry carcass front half 2 with the stabbing knife 28. In FIG. 2A, the pivot arm 26 is in the first position P1. FIG. 2B shows the pivot arm 26 in the second position P2.

Figure 2C:
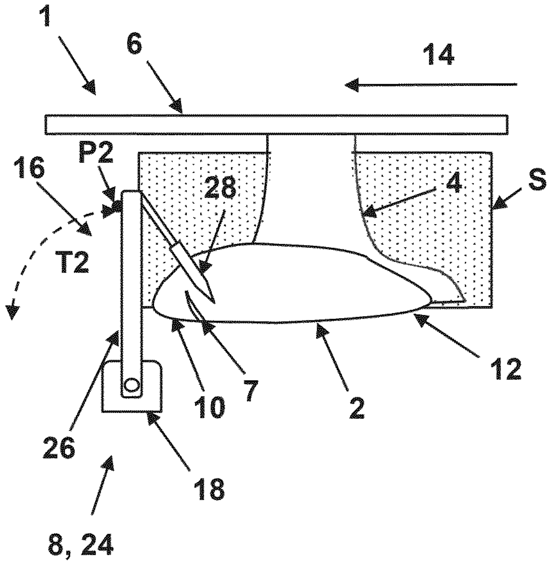
Figure 2D:
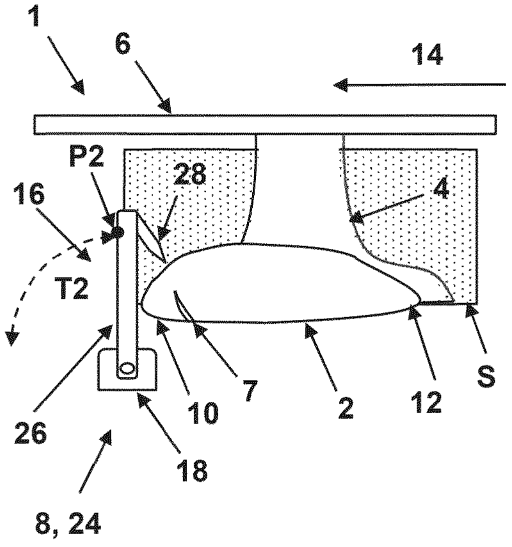

The stabbing knife 28 is in this example movably mounted to the pivot arm 26. The poultry processing station 8 is configured for imparting a stabbing motion to the stabbing knife 28 relative to the pivot arm 26. FIG. 2C shows the stabbing knife 28 in a stabbing position after the stabbing motion was imparted thereto. The stabbing motion is in this example in a direction substantially opposite to the conveyance direction 14. Here, the stabbing motion is at an oblique downward angle with respect to the conveyance direction 14. The stabbing knife 28 is in this example configured to cut the tissue between the wishbone 7 and the remaining part of the carcass front half 2. Thereto, the stabbing knife 28 has one or more sharp edges. The stabbing knife 28 is configured to return, after completing the stabbing motion, to its initial retracted position relative to the pivot arm 26. In FIG. 2D, the stabbing knife 28 has, after the stabbing motion, returned to the retracted position with respect to the pivot arm 26.

The pivot arm 26 is further configured for being pivotally moved from the second position P2 back to the first position P1 by reversing pivot direction. In the view of the example of FIGS. 2A-2D, the pivot arm 26 is pivotable from the first position P1 to the second position P2 in a clockwise direction about the pivot axis, and pivotable from the second position to the first position counter clockwise about the pivot axis.

Figure 3A:
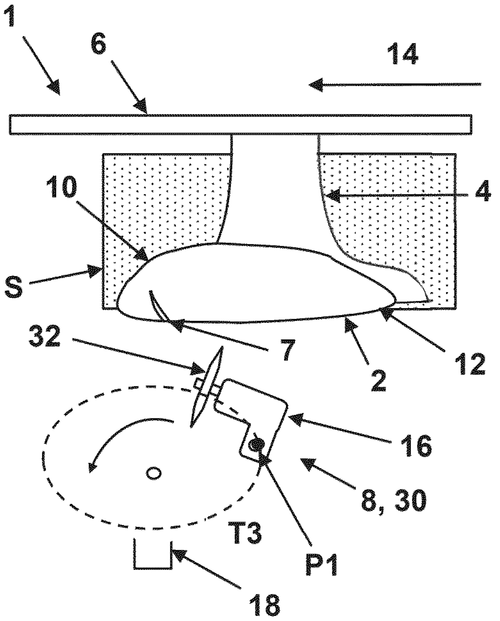
FIGS. 3A, 3B, 3C and 3D show illustrations of a schematic representation of an example of a side view of a poultry processing system.
Figure 3B:
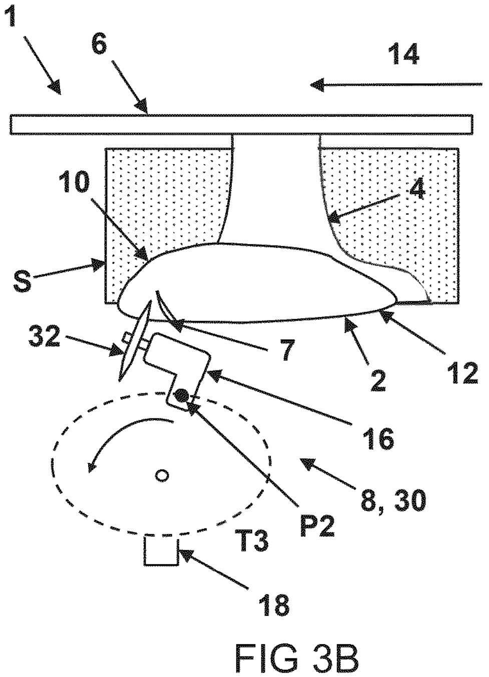
Figure 3C:
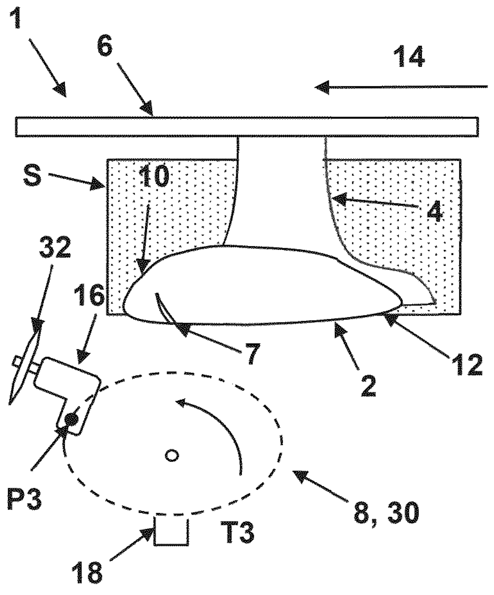
Figure 3D:
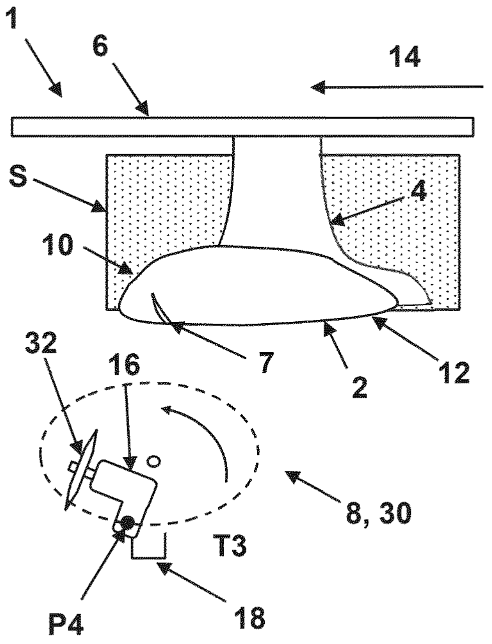

FIGS. 3A, 3B, 3C and 3D show illustrations of a schematic representation of an example of a side view of a poultry processing system 1 for inline processing a poultry carcass front half 2. The poultry processing station 8 of the system 1 is in this example a breast meat cutting station 30. The processing member 16 includes a breast meat cutter 32 having a cutting plane transverse to the plane of symmetry S. The breast meat cutter 32 is configured for being moved along a cyclic trajectory T3 in a plane parallel to the plane of symmetry S. The breast meat cutter 32 in this example comprises a rotatable blade. Here, the rotatable blade is configured for cutting one or more tendons that connect the wishbone 7 to the remainder of the carcass front half 2. In this example, the cyclic trajectory T3 includes a trajectory section, associated with the second position P2, in which the breast meat cutter 32 is moved in synchrony with the mandrel 4 for providing a cut in the poultry carcass front half 2 in the cutting plane. In FIG. 3A, the breast meat cutter 32 is in the first position P1. FIG. 3B shows the breast meat cutter 32 in the second position P2. In FIG. 3C, the breast meat cutter 32 is in the third position P3. The breast meat cutter 32 is in the fourth position P4 in FIG. 3D.

Figure 4A:
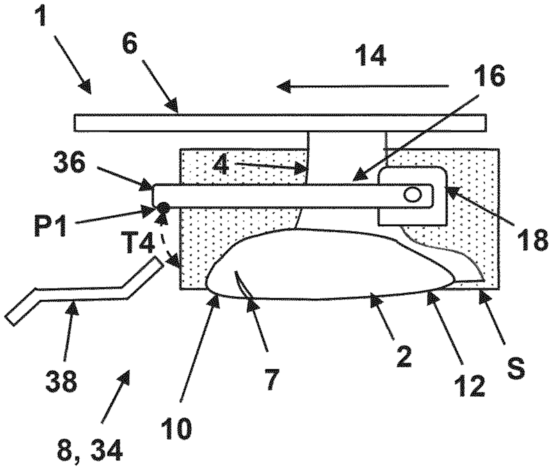
FIGS. 4A, 4B, 4C and 4D show illustrations of a schematic representation of an example of a side view of a poultry processing system.
Figure 4B:
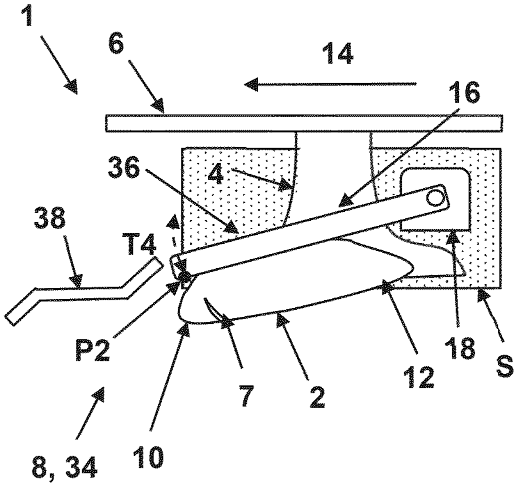
Figure 4C:
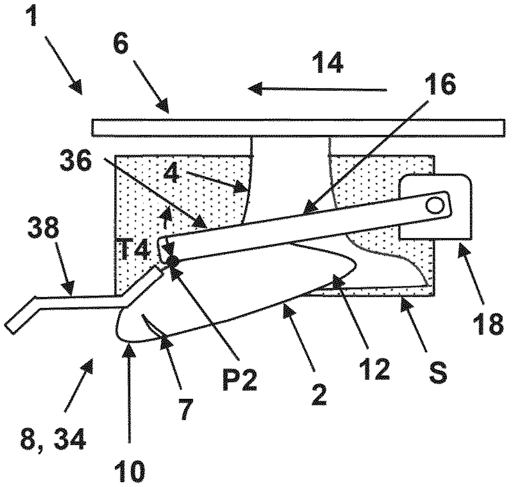
Figure 4D:
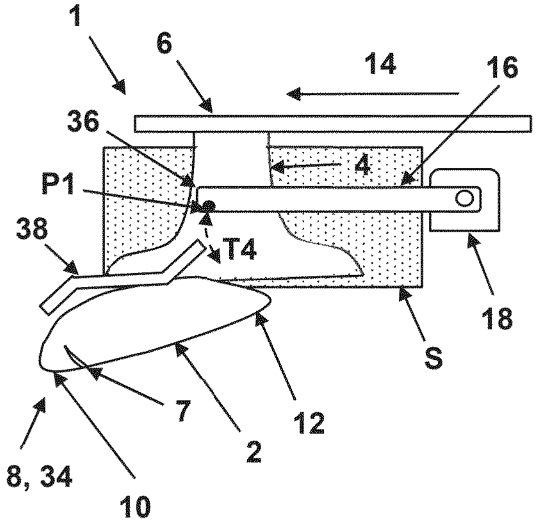

FIGS. 4A, 4B, 4C and 4D show illustrations of a schematic representation of an example of a side view of a poultry processing system 1 for inline processing a poultry carcass front half 2. The poultry processing station 8 of the system 1 is in this example a carcass front half unloading station 34. The carcass front half unloading station 34 is configured for unloading the carcass front half 2 from the mandrel 4 at a leading end of the mandrel 4. The processing member 16 in this example comprises a pusher organ 36 arranged above the conveyance path. The pusher organ 36 is configured for, while the poultry carcass front half 2 is being conveyed on the mandrel 4, being moved relative to the mandrel 4 in a substantially vertical direction for pushing a leading part of the carcass front half 2 downwards. Here, the pusher organ 36 is pivotably movable about a horizontal pivot axis that extends transverse to the conveyance direction 14. It will be appreciated that the pusher organ 36 can be translationally movable in a vertically downward direction instead. The pusher organ 36 is configured to move between the first and second position P1, P2. In FIG. 4A, the pusher organ 36 is in the first position P1. FIGS. 4B and 4C show the pusher organ 36 in the second position P2. In FIG. 4D, the pusher organ 36 is moved back into the first position P1. The pusher organ 36 is in this example biased towards the second position P2.

The carcass front half unloading station 34 comprises a stationary guide 38 in this example. The stationary guide 38 is arranged with respect to the conveyance path downstream of the pusher organ 36 for engaging the poultry carcass front half 2 and guiding the poultry carcass front half 2 further downward to urge the carcass front half 2 off the mandrel 4. Here, the stationary guide 38 includes two mutually symmetric guides being laterally spaced apart from each other. The guides comprise an upstream ramp section arranged at a downwardly directed incline with respect to the conveyance direction 14, an intermediate horizontal section parallel to the conveyance direction, and a downstream ramp section at a downwardly directed incline with respect to the conveyance direction 14.

Figure 5A:
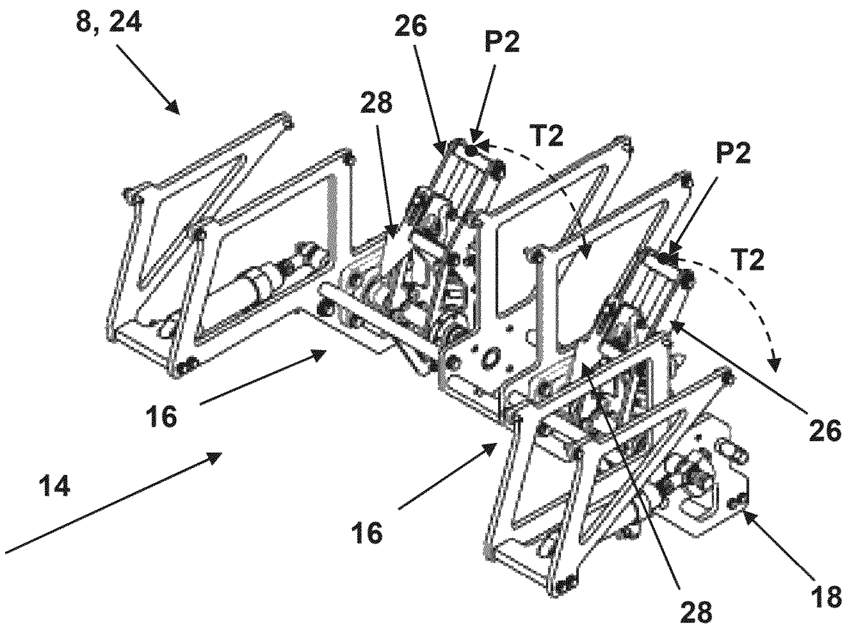
FIGS. 5A and 5B show illustrations of a detailed representation of an example of a wishbone pre-cutting station.
Figure 5B:
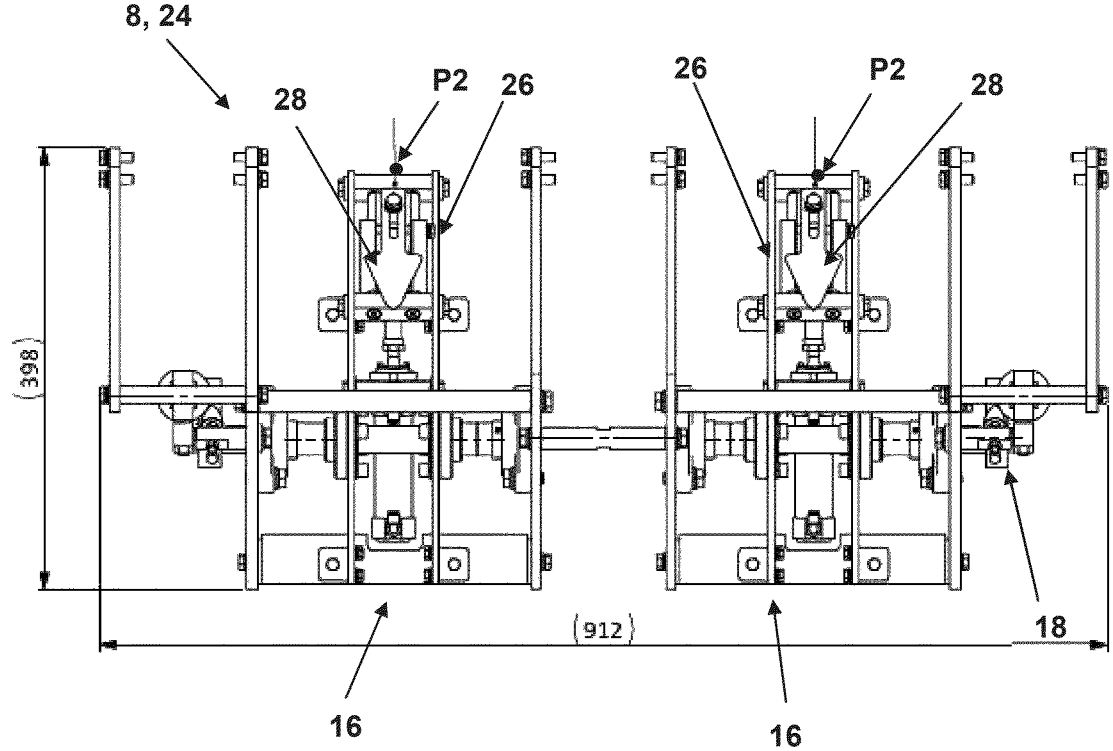

FIGS. 5A and 5B show illustrations of a schematic representation of an example of a wishbone pre-cutting station 24. The wishbone pre-cutting station 24 in this example comprises two processing members 16 arranged side to side. The pivot arms 26 and stabbing knives 28 of the processing members 16 are configured to each engage the carcass front half 2 as the carcass front half 2 is conveyed on the mandrel 4. Therefore in this example the wishbone pre-cutting station 24 is configured for processing carcass front halves 2 in two parallel streams of conveyed carcass front halves 2. The stabbing knife 28 in this example has an arrow shape for cutting the tissue and/or tendons between the wishbone 7 and the remainder of the carcass front half 2. FIG. 5A shows a perspective view of the wishbone pre-cutting station 24, and FIG. 5B shows a front view of the wishbone pre-cutting station 24.

Figure 6A:
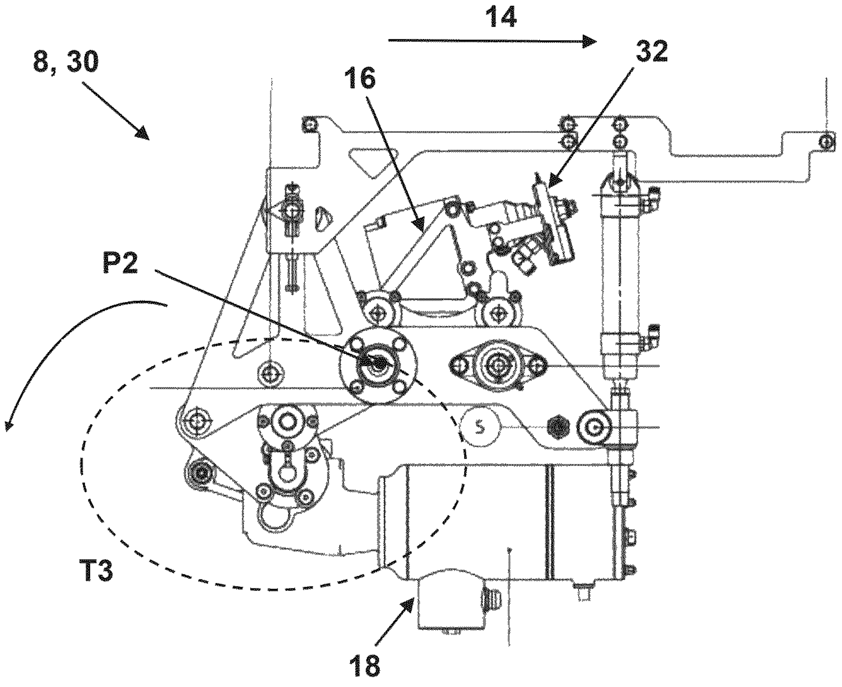
FIGS. 6A and 6B show illustrations of a detailed representation of an example of a breast meat cutting station.
Figure 6B:
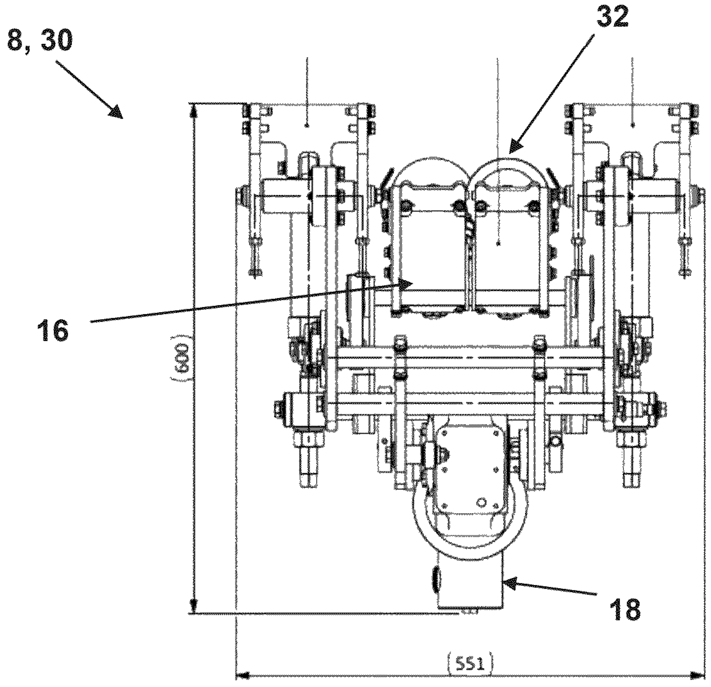

FIGS. 6A and 6B show illustrations of a schematic representation of an example of a breast meat cutting station 30. The breast meat cutter 32 of the breast meat cutting station 30 in this example comprises two rotatable blades. Here, each rotatable blade is configured for cutting the tendons and/or tissue of a different one of two sides of the wishbone 7 loose from the carcass front half 2. FIG. 6A shows a side view of the breast meat cutting station 30, and FIG. 6B shows a back view of the breast meat cutting station 30.

Figure 7A:
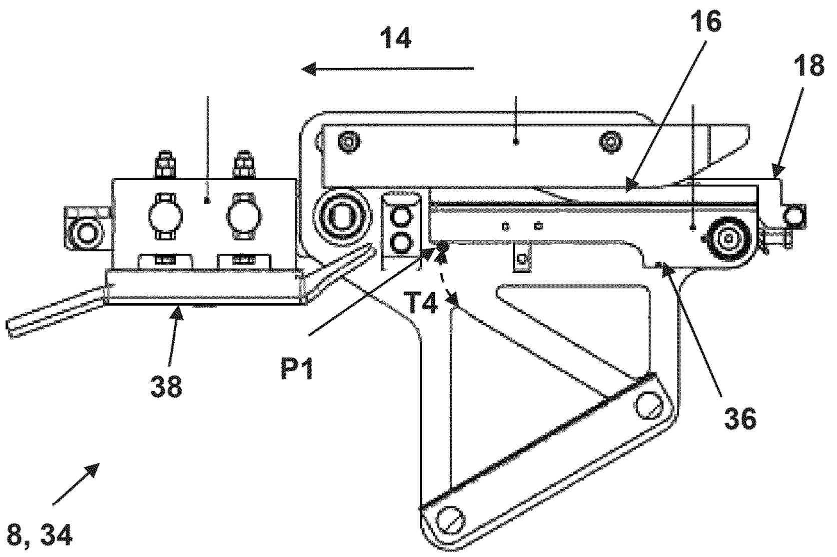
FIGS. 7A and 7B show illustrations of a detailed representation of an example of a carcass front half unloading station.
Figure 7B:
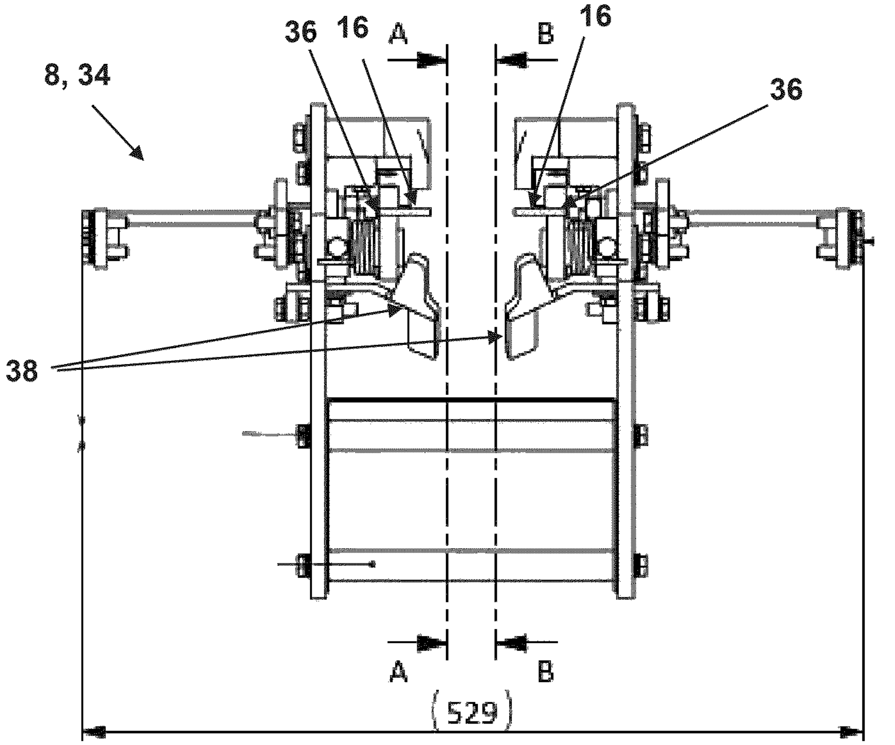

FIGS. 7A and 7B show illustrations of a schematic representation of an example of a carcass front half unloading station 34. The carcass front half unloading station 34 in this example comprises two parallel pusher organs 36 and two parallel stationary guides 38. The stationary guides 38 each comprise a slanted surface with respect to the horizontal. FIG. 7A shows a side view of the carcass front half unloading station 34, and FIG. 7B shows a back view of the carcass front half unloading station 34.

Figure 8:
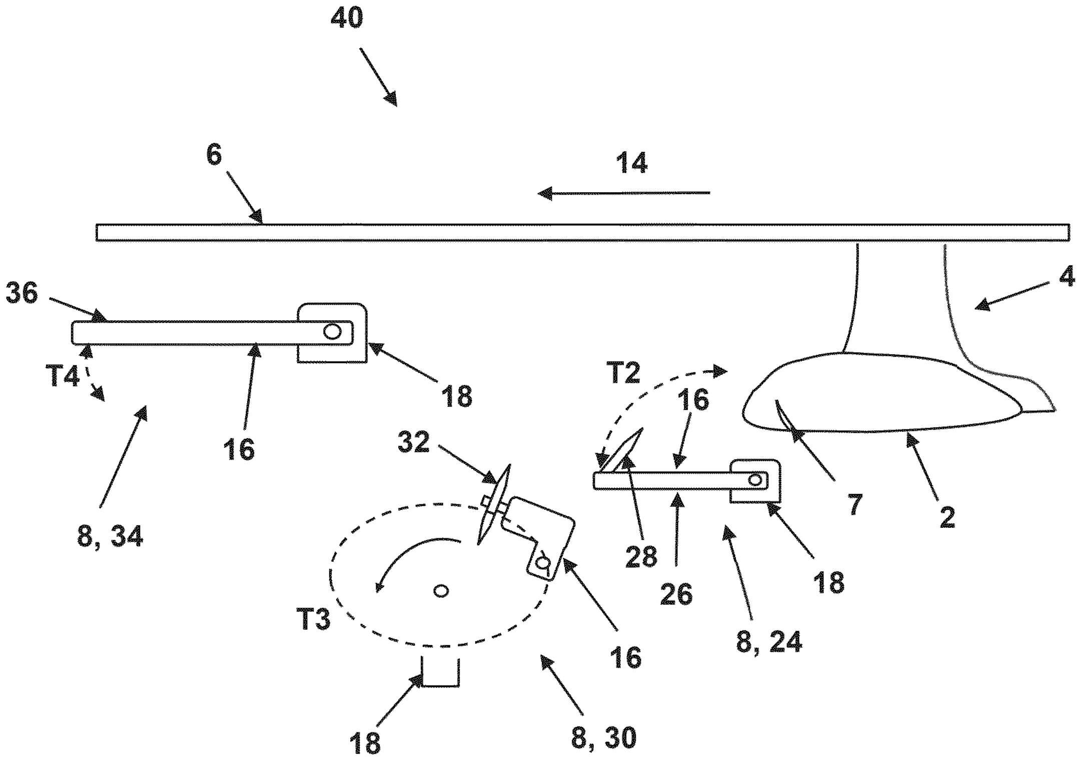
FIG. 8 shows an illustration of a schematic representation of an example of a side view of a multi-station poultry processing system.

FIG. 8 shows an illustration of a schematic representation of an example of a side view of a multi-station poultry processing system 40 for inline processing a poultry carcass front half 2. The multi-station poultry processing system 40 comprises the mandrel 4, the conveyor 6 and at least two poultry processing stations 8 as described. In this example, the at least two poultry processing stations 8 comprises the wishbone pre-cutting station 24, the breast meat cutting station 30, and the carcass front half unloading station 34 as described in view of FIGS. 1A-4D. The at least two poultry processing stations 8 are consecutively positioned in the conveyance path, e.g. in the conveyance direction 14, of the conveyor 6.

Figure 9:
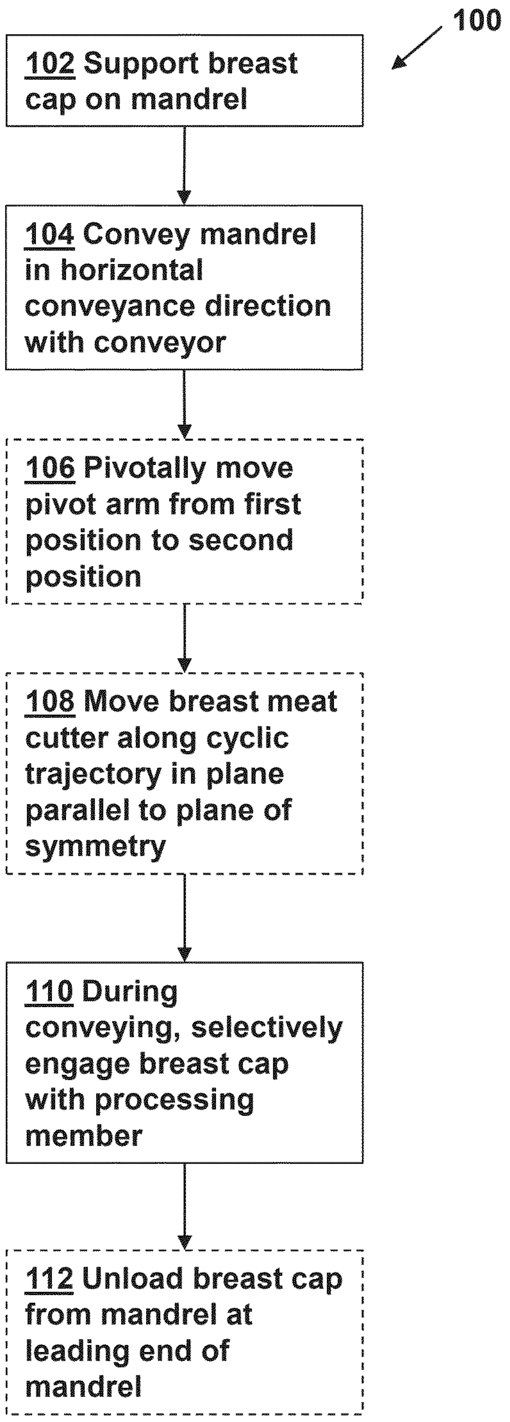
FIG. 9 shows an exemplary flow chart of a method for inline processing of a poultry carcass front half.

FIG. 9 shows an exemplary flow chart of a method 100 for inline processing of a poultry carcass front half 2. The method 100 can be performed using a poultry processing system 1 according to any of FIGS. 1A-4D. Optional steps are shown in dashed boxes. In a first step 102, the method 100 comprises supporting the carcass front half 2 on the mandrel 4. The mandrel 4 is conveyed in a horizontal conveyance direction 14 with the conveyor 6 in step 104.

In case the poultry processing station 8 is a wishbone pre-cutting station 24, the method 100 can further comprise pivotally moving the pivot arm 26 from the first position P1 to the second position P2 in step 106. If the poultry processing station 8 is a breast meat cutting station 30, optional step 108 can comprise moving the breast meat cutter 32 along a cyclic trajectory T3 in a plane parallel to the plane of symmetry S. During conveying, the carcass front half 2 is selectively engaged with the processing member 16 of the poultry processing station 8 in the conveyance path of the conveyor 6 as the carcass front half 2 is conveyed on the mandrel 4 in the fixed orientation along the poultry processing station 8 in step 110. If the poultry processing station 8 is a carcass front half unloading station 34, the carcass front half 2 can be unloaded from the mandrel 4 at a leading end of the mandrel 4 in step 112.

The method 100 can be performed as a method for multi-station inline processing of a poultry carcass front half 2, if at least two different ones of the optional steps 106, 108 and 112 are performed. Each step can be performed with the respective one of the at least two different poultry processing stations 8 as described. The at least two of the method steps 106, 108 and 112 are consecutively performed on the carcass front half 2 while the mandrel is being conveyed in the conveyance direction 14. The method for multi-station inline processing of a poultry carcass front half 2 can e.g. be performed using the multi-station poultry processing system 40 described in view of FIG. 8.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A poultry processing system for inline processing a poultry carcass front half, comprising:

a mandrel having a plane of symmetry for supporting a carcass front half having a neck end and a tail end with its skeletal structure including a keel bone on top of the mandrel with the keel bone aligned with the plane of symmetry of the mandrel, a conveyor for conveying the mandrel in a horizontal conveyance direction, wherein the mandrel is coupled to the conveyor in a fixed orientation relative to the conveyance direction in which the plane of symmetry is vertical and aligns with the conveyance direction; and a poultry processing station in a conveyance path of the conveyor, the poultry processing station comprising a processing member for engaging the carcass front half as the carcass front half is conveyed on the mandrel in the fixed orientation along the poultry processing station, wherein the processing member is movable relative to the conveyor along a trajectory within a vertical plane parallel to the plane of symmetry between a first position for allowing the carcass front half to pass the processing member, and a second position for engaging the carcass front half.

2. The poultry processing system according to claim 1, wherein the poultry processing station is a wishbone pre-cutting station, and the processing member includes a pivot arm that is pivotable about a horizontal pivot axis extending transverse to the conveyance direction, and a stabbing knife that is mounted to the pivot arm, and wherein the pivot arm is configured for being pivotally moved from the first position, in which the pivot arm for example is in a substantially horizontal orientation, to the second position, in which the pivot arm is in a substantially vertical orientation, the second position being with respect to the conveyance direction in front of the mandrel for stabbing a leading part of the poultry carcass front half with the stabbing knife.

3. The poultry processing system according to claim 2, wherein the pivot arm is configured for being pivotally moved from the second position back to the first position in reverse direction for withdrawing the stabbing knife from the leading part of the poultry carcass.

4. The poultry processing system according to claim 2, wherein the stabbing knife is movably mounted to the pivot arm, and the poultry processing station is configured for imparting a stabbing motion to the stabbing knife relative to the pivot arm.

5. The poultry processing system according to claim 4, wherein the stabbing motion is in a direction substantially opposite to the conveyance direction.

6. The poultry processing system according to claim 5, the stabbing motion is at an oblique downward angle with respect to the conveyance direction.

7. The poultry processing system according to claim 1, wherein the poultry processing station is a breast meat cutting station and the processing member includes a breast meat cutter having a cutting plane transverse to the plane of symmetry, wherein the breast meat cutter is configured for being moved along a cyclic trajectory in a plane parallel to the plane of symmetry.

8. The poultry processing system according to claim 7, wherein the cyclic trajectory includes a trajectory section, associated with the second position, in which the breast meat cutter is moved in synchrony with the mandrel for providing a cut in the poultry carcass front half in the cutting plane.

9. The poultry processing system according to claim 1, wherein the poultry processing station is a carcass front half unloading station configured for unloading the carcass front half from the mandrel at a leading end of the mandrel.

10. The poultry processing system according to claim 9, wherein the processing member comprises a pusher organ arranged above the conveyance path and configured for, while the poultry carcass front half is being conveyed on the mandrel, being moved relative to the mandrel in a substantially vertical direction for pushing a leading part of the carcass front half downwards.

11. The poultry processing system according to claim 10, wherein the pusher organ is pivotably movable about a horizontal pivot axis that extends transverse to the conveyance direction.

12. The poultry processing system according to claim 10, wherein the pusher organ is biased towards the second position.

13. The poultry processing system according to claim 10, wherein the carcass front half unloading station comprises a stationary guide arranged with respect to the conveyance path downstream of the pusher organ for engaging the poultry carcass front half and guiding the poultry carcass front half further downward to urge the carcass front half off the mandrel.

14. The poultry processing system according to claim 13, wherein the stationary guide includes two mutually symmetric guides being laterally spaced apart from each other, the guides comprising a upstream ramp section arranged at a downwardly directed incline with respect to the conveyance direction, an intermediate horizontal section parallel to the conveyance direction, and a downstream ramp section at a downwardly directed incline with respect to the conveyance direction.

15. A method for inline processing of a poultry carcass front half, comprising:

supporting the carcass front half on a mandrel, wherein the mandrel has a plane of symmetry in a vertical orientation for supporting the carcass front half having a neck end and a tail end with its skeletal structure including a keel bone on top of the mandrel with the keel bone aligned with the plane of symmetry of the mandrel;

conveying the mandrel in a horizontal conveyance direction with a conveyor, wherein the mandrel is coupled to the conveyor in a fixed orientation relative to the conveyance direction in which the plane of symmetry aligns with the conveyance direction;

during conveying, selectively engaging the carcass front half with a processing member of a poultry processing station in a conveyance path of the conveyor as the carcass front half is conveyed on the mandrel in the fixed orientation along the poultry processing station, wherein the processing member is movable relative to the conveyor along a trajectory within a vertical plane parallel to the plane of symmetry between a first position for allowing the carcass front half to pass the processing member, and a second position for engaging the carcass front half.

16. The method according to claim 15, wherein the poultry processing station is a wishbone pre-cutting station, and the processing member includes a pivot arm that is pivotable about a horizontal pivot axis extending transverse to the conveyance direction, and a stabbing knife that is mounted to the pivot arm, and wherein the method further comprises pivotally moving the pivot arm from the first position, in which the pivot arm for example is in a substantially horizontal orientation, to the second position, in which the pivot arm for example is in a substantially vertical orientation, the second position being with respect to the conveyance direction in front of the mandrel for stabbing a leading part of the poultry carcass front half with the stabbing knife.

17. The method according to claim 15, wherein the poultry processing station is a breast meat cutting station and the processing member includes a breast meat cutter having a cutting plane transverse to the plane of symmetry, and wherein the method further comprises moving the breast meat cutter along a cyclic trajectory in a plane parallel to the plane of symmetry.

18. The method according to claim 15, wherein the poultry processing station is a carcass front half unloading station, and wherein the method further comprises unloading, using the carcass front half unloading station, the carcass front half from the mandrel at a leading end of the mandrel.

* * * * *